(12) United States Patent
Sportelli

(10) Patent No.: US 6,533,583 B1
(45) Date of Patent: Mar. 18, 2003

(54) INSTRUCTIONAL PLAN GENERATING AND MONITORING SYSTEM

(76) Inventor: Victoria C. Sportelli, 1205 E. 28th St., Sioux Falls, SD (US) 57105-3214

( * ) Notice: Subject to any disclaimer, the term of this patent is extended or adjusted under 35 U.S.C. 154(b) by 138 days.

(21) Appl. No.: 09/884,827

(22) Filed: Jun. 18, 2001

(51) Int. Cl.[7] .............................. G09B 3/00; G09F 17/30
(52) U.S. Cl. ........................ 434/118; 434/350; 434/362; 707/102
(58) Field of Search ................................. 434/118, 324, 434/322, 323, 350, 307 R, 362, 359; 707/102, 517, 530, 104, 100

(56) References Cited

U.S. PATENT DOCUMENTS

| | | |
|---|---|---|
| 5,173,051 A | 12/1992 | May et al. |
| 5,267,865 A | 12/1993 | Lee et al. |
| 5,385,475 A | 1/1995 | Sudman et al. |
| 5,393,236 A * | 2/1995 | Blackmer et al. ............ 434/169 |
| 5,616,033 A | 4/1997 | Kerwin |
| 5,864,869 A | 1/1999 | Doak et al. |
| 5,978,648 A | 11/1999 | George et al. |
| 6,024,577 A | 2/2000 | Wadahama et al. |
| 6,039,575 A | 3/2000 | L'allier et al. |
| 6,149,441 A * | 11/2000 | Pellegrino et al. ........... 434/350 |
| 6,273,725 B1 * | 8/2001 | Bernstein et al. ............ 434/154 |
| 2002/0055089 A1 * | 5/2002 | Scheirer ...................... 434/350 |

* cited by examiner

Primary Examiner—Hieu T. Vo
(74) Attorney, Agent, or Firm—Kaardal & Leonard, LLP; Jeffrey A. Proehl

(57) ABSTRACT

An instructional plan generating and monitoring system for assisting instructors in the formation of lesson plans incorporating teaching elements that meet the goals of the instructor and the instructor's supervisors. The instructional plan generating and monitoring system includes creating an account file on a database according to setup information provided by a user, the account file including account information, creating a class file on the database for an instructional class covering a course or subject as initiated by an instructor user for the instructional class, the class file containing requirements for the course or subject, assembling an instructional lesson plan file for one of the instructional classes having a class file on the database, and generating a summary report counting and tallying the elements of the instructional lesson plans of the instructor user according to criteria based on reporting requirements of the group account or the individual account covering the instructor user.

30 Claims, 31 Drawing Sheets

Open Your Account

Enter Your Account Number: ☐

Enter Your Password: ☐

(Remember your password is case sensitive.)

We're sorry. Your Account Number/Password is incorrect. Please check your records and try again.

We regret to inform you that your Account/Password is still entered incorrectly. To gain access to your account please enter:
Your name: ☐
Your school district: ☐

FIG. 13

Start A New Course/Subject

Year: [2000] to [2001]  (Enter 4 digits for starting year and ending year.)

Name: [British Literature]  (Enter name without using periods or other punctuation marks.)

This is a: [Course] [Subject]  (Choose only one.)

[Go To Next Screen]

FIG. 15

Start A New Course/Subject 2000 to 2001 British Literature

Course Goals: Enter as many course goals as you wish in the box below, but we recommend that you limit the goals to fewer than ten.

1. To know how a great world literature is formed over time and by culture, history, circumstance, and artists.

2. To demonstrate the ties between British literature and American literature.

3. To show how our use of the English language is interrelated with that of British use.

Go To Next Screen

FIG. 16

| 2000 | to | 2001 | | British Literature |

Course Goals:
1. To know how a great world literature is formed over time and by culture, history, circumstance, and artists.
2. To demonstrate the ties between British literature and American literature.
3. To show how our use of the English language is interrelated with that of British use.

According to the contract set up by | School District No. 1 |, you may now select | 8 | teaching methods to include in your lessons. Please take time to preview all your choices. Left click on a teaching method, then choose "Preview" to examine that choice. Choose "Select" to indicate your choice.

| Preview | | Bloom's Taxonomy | | Multiple Intelligences |
| Select | | Circles of Courage | | Multiple Talents |
| | | Learning Styles | | After previewing these teaching methods, I wish to reconfigure my service contract. |

| Go To Next Screen |

FIG. 17

| 2000 | to | 2001 | | British Literature |

Course Goals:
1. To know how a great world literature is formed over time and by culture, history, circumstance, and artists.
2. To demonstrate the ties between British literature and American literature.
3. To show how our use of the English language is interrelated with that of British use.

Methods Currently Selected:

| Multiple Talents | Bloom's Taxonomy | Learning Styles |

IMPORTANT: Once you click "Save" below, this course's name, goals, and methods will be locked and cannot be changed. Later you may add course goals, but you cannot alter or delete the goals written above. The methods you have chosen will be locked as well and can not be changed.

| BACK ONE SCREEN | AHEAD ONE SCREEN | SAVE |

FIG. 18

| 2000 | to | 2001 | | British Literature |

The contract of | School District No. 1 | requires that you send each course lesson plan to the following READ ONLY sites:

Principal of:
☐ Washington High School
☐ Lincoln High School
☐ Roosevelt Middle School
☐ Kennedy Elementary School Principal Administrator:
(Please click on the name of your school.)

| BACK ONE SCREEN |    | GO TO NEXT SCREEN |

FIG. 21

| 2000 | to | 2001 | | British Literature |

The contract of | School District No. 1 | also states that you | must | send your lesson to the following approved website for | 10 | days:

| http://.www.SchoolDistrict_No._1.edu |

Please select which portions of your lesson plans you want posted:

☐ All portions
☐ Course goals    ☐ Procedures
☐ Unit goals      ☐ Methods
☐ Lesson goals    ☐ Assignment
☐ Steps           ☐ Evaluation When do you want these portions posted?

☐ One day before lesson date
☐ Day of lesson date
☐ One day after lesson date (Note: You cannot proceed without making at least one selection in each box.)

| BACK ONE SCREEN |    | GO TO NEXT SCREEN |

FIG. 22

Create A Summary Report

Type of Report Desired:

☐ Annual: Year: [2000] to [2001]
   to date

☐ Course: Year: [2000] to [2001]
   to date

Course Name: ▲ | American Literature
                        British Literature
                        Composition I |

Unit Name: ▲ | Include All Units
                     Anglo-Saxon
                     Language |

☐ Comprehensive: (This report is a combination of all choices above.)

[BACK ONE SCREEN] [MAIN MENU] [PREVIEW]

FIG. 25

Summary Report

YEAR:
COURSE/SUBJECT 1:
   GOAL 1:
      UNIT:
         OBJECTIVE 1:
         ..
         LESSON:
            OBJECTIVE 1:
            ..
            PROCEDURES:
               CHOICE 1:
               ..
            METHOD A:
               CHOICE 1:
               ..
            METHOD B:
               CHOICE 1:
               ..
            EVALUATION:
               TEACHER:
                  CHOICE 1:
               STUDENT:
                  CHOICE 1:
COURSE/SUBJECT 2:
..

[PRINT] [BACK ONE SCREEN] [MAIN MENU]

FIG. 26

Build a New Lesson Plan

2000 To 2001-British Literature-Language

Name of Plan: Day 1
Date of Lesson:

Course Goals △ (Click to see listing of Course Goals. You must choose at least one goal for this lesson plan to proceed.)

Objectives:
Unit:
1.
2.
Lesson:
1.
2.

Procedures: Enter your own or  View listing of possible procedures
1.
2.

| PROCEDURES COMPLETED | BACK ONE SCREEN | PREVIEW |

FIG. 29

Build a New Lesson Plan

2000 To 2001-British Literature-Language

Name of Plan: [Day 1]
Date of Lesson: [ ]

Methods:

| Multiple Intelligences | Bloom's Taxonomy | Learning Styles |
|---|---|---|
| Evaluation | Linguistic | Sensing/Thinking |
| Synthesis | Logical/Mathematical | Sensing/Feeling |
| Analysis | Spatial | Intuiting/Thinking |
| Application | Bodily/Kinesthetic | Intuiting/Feeling |
| Comprehension | Musical | |
| Knowledge | Interpersonal | |
| | Intrapersonal | |

Instructions:
1. Left click to highlight.
2. Right click to add or delete from lesson.
3. Select as many as apply to this lesson.

[METHOD SELECTION COMPLETED] [BACK ONE SCREEN] [PREVIEW]

FIG. 30

Build a New Lesson Plan

2000 To 2001-British Literature-Language

Name of Plan: Day 1

Date of Lesson:

Steps for lesson plan (Enter as many as needed):
1.
2.
3.

Materials (Enter as many as needed):
Instructor:
1. Text:
2. Handouts:
3. Overhead Projector Student:
1. Assignment:
2. Textbook:
3. Time Tracker Evaluations (Enter as desired):
Instructor:
1.

Student:
1.

Assignments (Enter as desired):
1.
2.

| SELECTIONS COMPLETED | BACK ONE SCREEN | PREVIEW/PRINT |

FIG. 31

INSTRUCTIONAL PLAN GENERATING AND MONITORING SYSTEM

BACKGROUND OF THE INVENTION

1. Field of the Invention

The present invention relates to instructional planning systems and more particularly pertains to a new instructional plan generating and monitoring system for assisting instructors in the formation of lesson plans incorporating teaching elements that meet the goals of the instructor and the instructor's supervisors.

2. Description of the Prior Art

The use of instructional planning systems is known in the prior art. Known systems have facilitated the formation of conventional lesson plans by applying the benefits of computer processing to steps that were previously performed manually by the instructors. The formation of the lesson plans under these systems is performed in varying degrees of specificity, and may provide the instructor user with various measures of progress in lesson plan formation. The known systems have also provided instructors with the ability to distribute curriculum materials (such as lessons in a text form) to the students through a computer medium, especially in combination with multimedia presentations. The known systems have also provided instructors with the ability to design lessons that the student may access for learning at the student's own individualized pace, rather than a uniform pace imposed upon a group of students, and also the ability to individually test and monitor an individual student's progress.

However, the known instructional planning systems have generally left the content and approach of the lesson plans up to the individual instructors executing the lesson plans. These systems have lacked any apparent mechanism for establishing, or for administratively monitoring, uniformity in the teaching approaches and methods employed by the individual instructors educating within a common administrative unit such as a school district. These systems, while presumably enhancing the efforts of the instructors in their education efforts, have not provided any significant benefits to administrators in the supervision of the instructors using these new tools.

In these respects, the instructional plan generating and monitoring system according to the present invention substantially departs from the conventional concepts of the prior art, and in so doing provides a system primarily developed for the purpose of assisting instructors in the formation of lesson plans incorporating teaching elements that meet the goals of the instructor and the instructor's supervisors.

SUMMARY OF THE INVENTION

In view of the foregoing disadvantages inherent in the known types of instructional planning systems now present in the prior art, the present invention provides a new instructional plan generating and monitoring system wherein the same can be utilized for assisting instructors in the formation of lesson plans incorporating teaching elements that meet the goals of the instructor and the instructor's supervisors.

The present invention generally includes creating an account file on a database according to setup information provided by a user, the account file including account information, creating a class file on the database for an instructional class covering a course or subject as initiated by an instructor user for the instructional class, the class file containing requirements for the course or subject, assembling an instructional lesson plan file for one of the instructional classes having a class file on the database, and generating a summary report counting and tallying the elements of the instructional lesson plans of the instructor user according to criteria based on reporting requirements of the group account covering the instructor user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details and relationships set forth in the following description or illustrated in the drawings. The invention is capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other methods and systems for carrying out the several purposes of the present invention. It is important, therefore, that the claims be regarded as including such equivalents insofar as they do not depart from the spirit and scope of the present invention.

The objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 13 is a schematic representation of a display screen showing an account-opening screen of the present invention.

FIGS. 15 through 20 are schematic representations of display screens for a new course/subject creation process of the present invention.

FIG. 21 is a schematic representation of a display screen showing an instructor reporting screen of the new course/subject creation process of the present invention.

FIG. 22 is a schematic representation of a display screen showing a lesson plan posting selection screen of the new course/subject creation process of the present invention.

FIGS. 25 and 26 are schematic representations of display screens showing a summary report generation process of the present invention.

FIGS. 27 through 31 are schematic representation of display screens showing a lesson plan formation process of the present invention.

DESCRIPTION OF THE PREFERRED INVENTION

With reference now to the drawings, and in particular to FIGS. 1 through 31 thereof, a new instructional plan generating and monitoring system embodying the principles and concepts of the present invention will be described.

As best illustrated in FIGS. 1 through 31, the instructional plan generating and monitoring system of the invention generally includes a method for generating and monitoring instructional plans of instructors that includes steps of creating an account file on a database according to setup information provided by a user, the account file including account information, creating a class file on the database for an instructional class covering a course or subject as initiated by an instructor user for the instructional class, the class file containing requirements for the course or subject, assembling an instructional lesson plan file for one of the instructional classes having a class file on the database, and generating a summary report summarizing instructional lesson plans of the instructor user according to criteria based on reporting requirements of the group account covering the instructor user.

As a matter of introduction to the terminology employed for the purposes of the following description, it should be understood that a lesson plan generally covers a set of steps or procedures executed by an instructor, and for the most part these steps or procedures will be executed in a single class period, although the lesson plan could conceivably cover more than one class period, or a fraction of a class period. One or more lesson plans may be combined by a generally common theme to comprise a unit of instruction, and one or more of the units with an overarching theme may collectively comprise an instructional class, which corresponds to a course offered by a school, or a subject of a class. For the purposes of this description, the terminology "instructional class" or "class" will be assumed to include both courses and subjects of an educational institution.

One aspect of the system of the invention involves an opening menu (see FIGS. 1 and 12) that may be made available on a network providing access to the system by registered or authorized users of the system, and the network may also provide access to the system by potential users (who are unregistered) of the system such as individual educators and education organizations such as school districts. The opening menu is most preferably accessible through a public network, and one such public network is commonly referred to as the "Internet" or "World Wide Web".

Figure 1:
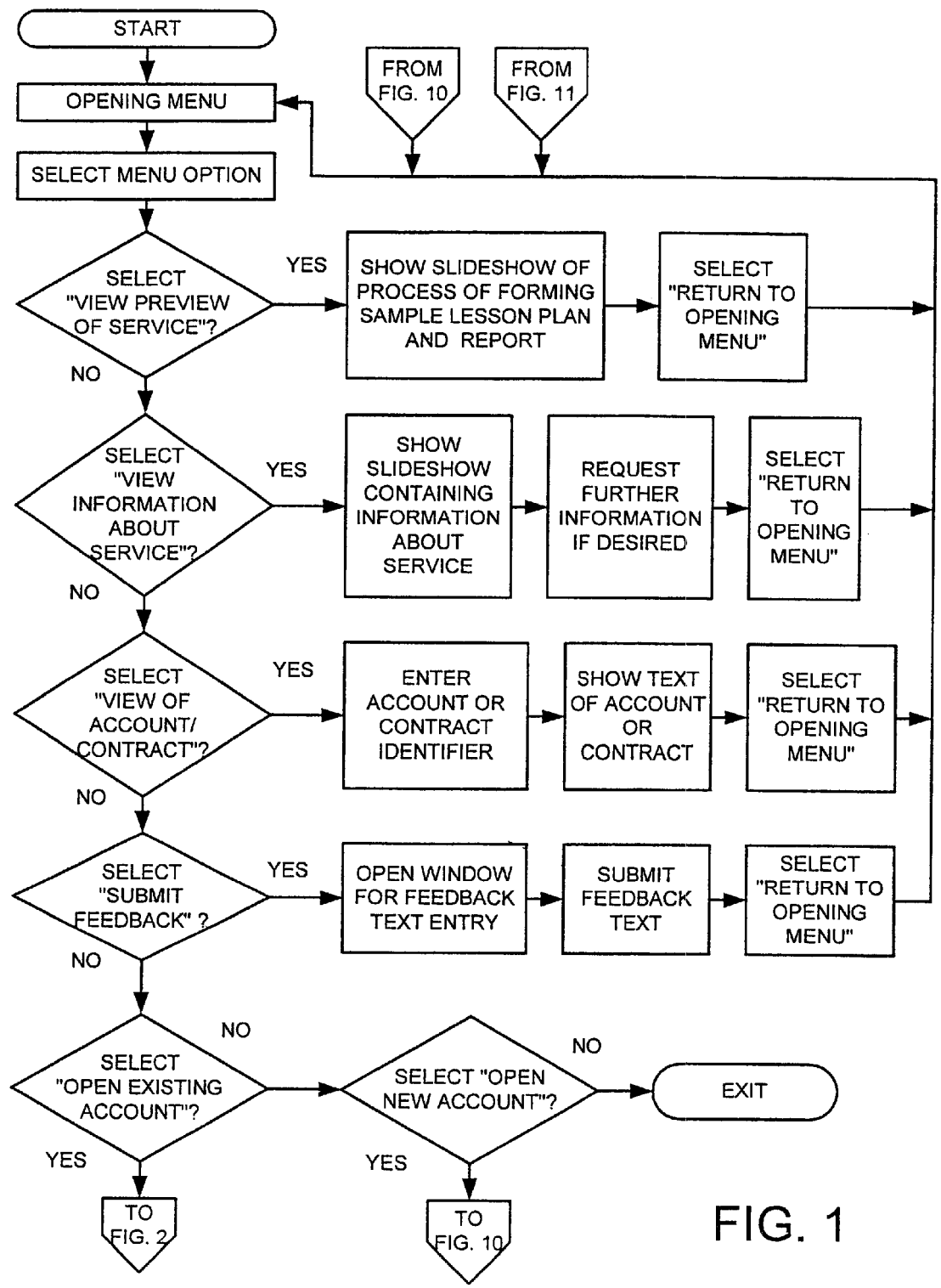
FIG. 1 is a schematic flowchart of an opening menu for the system of the present invention particularly illustrating aspects of the system accessible by the general public on a public computer network.
Figure 12:
FIG. 12 is a schematic representation of a display screen showing an opening menu screen of the instructional plan generating and monitoring system according to the present invention.
Figure 14:
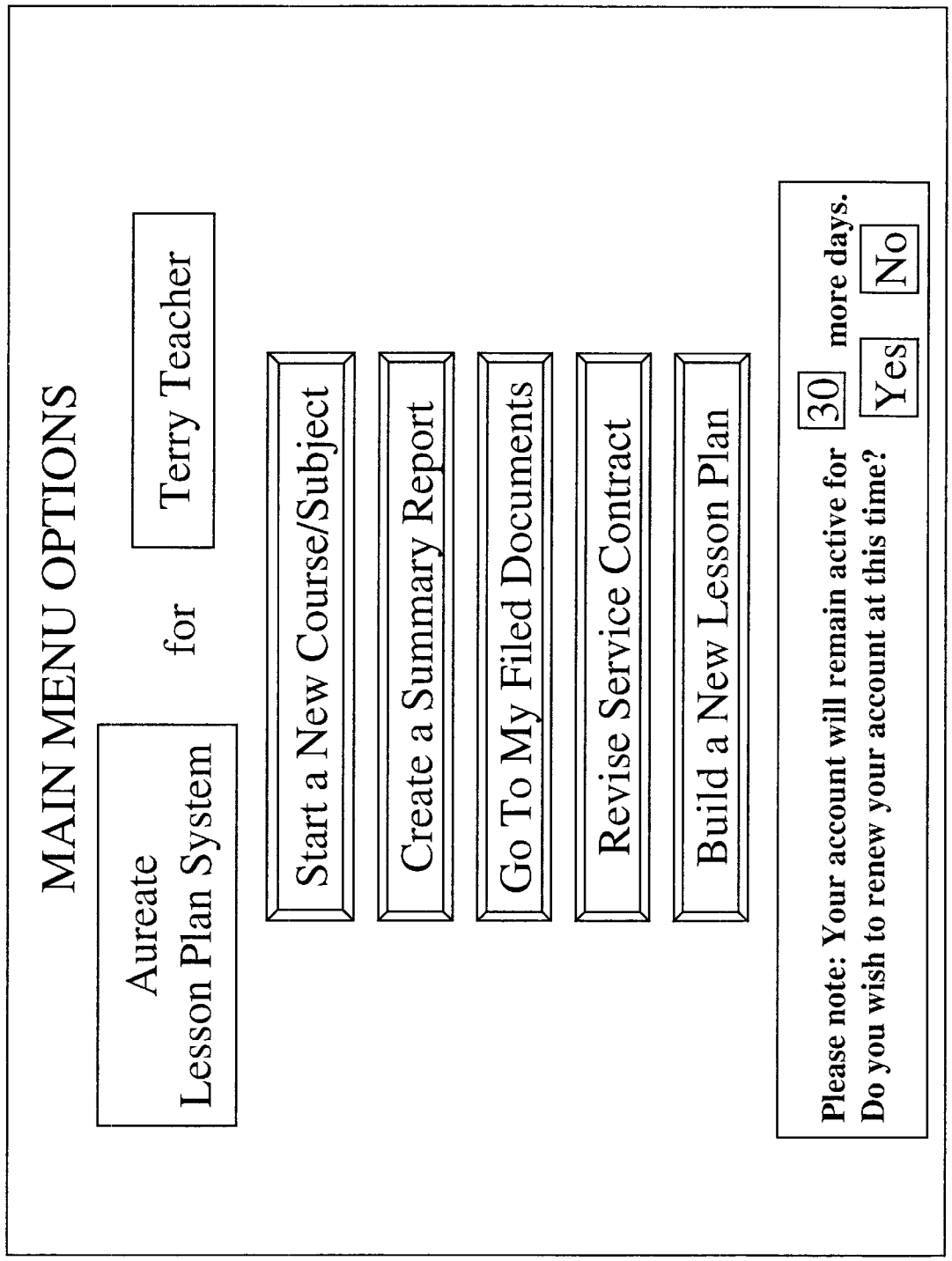
FIG. 14 is a schematic representation of a display screen showing a main menu screen of the present invention.
Figure 19:
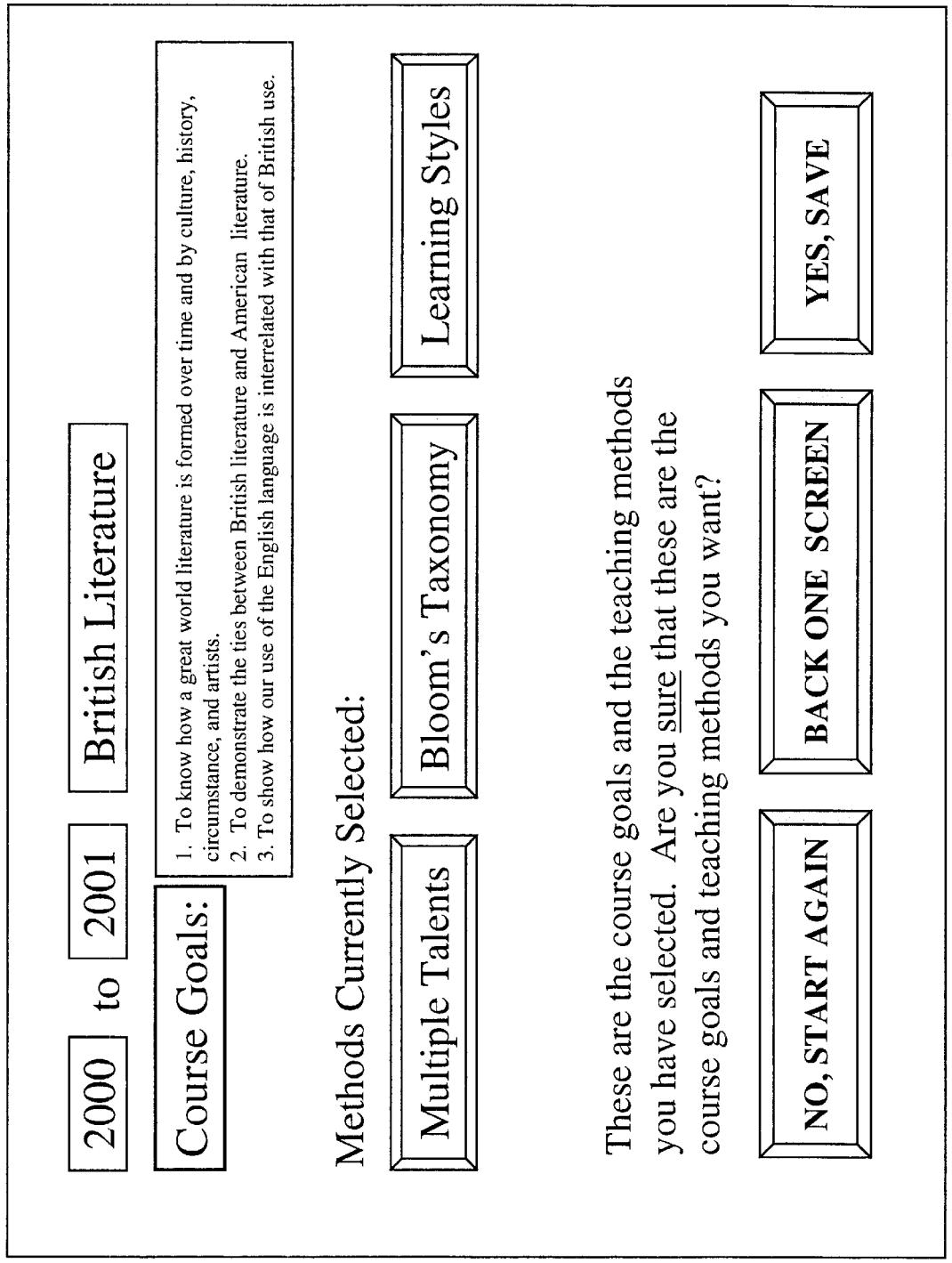
Figure 20:
Figure 23:
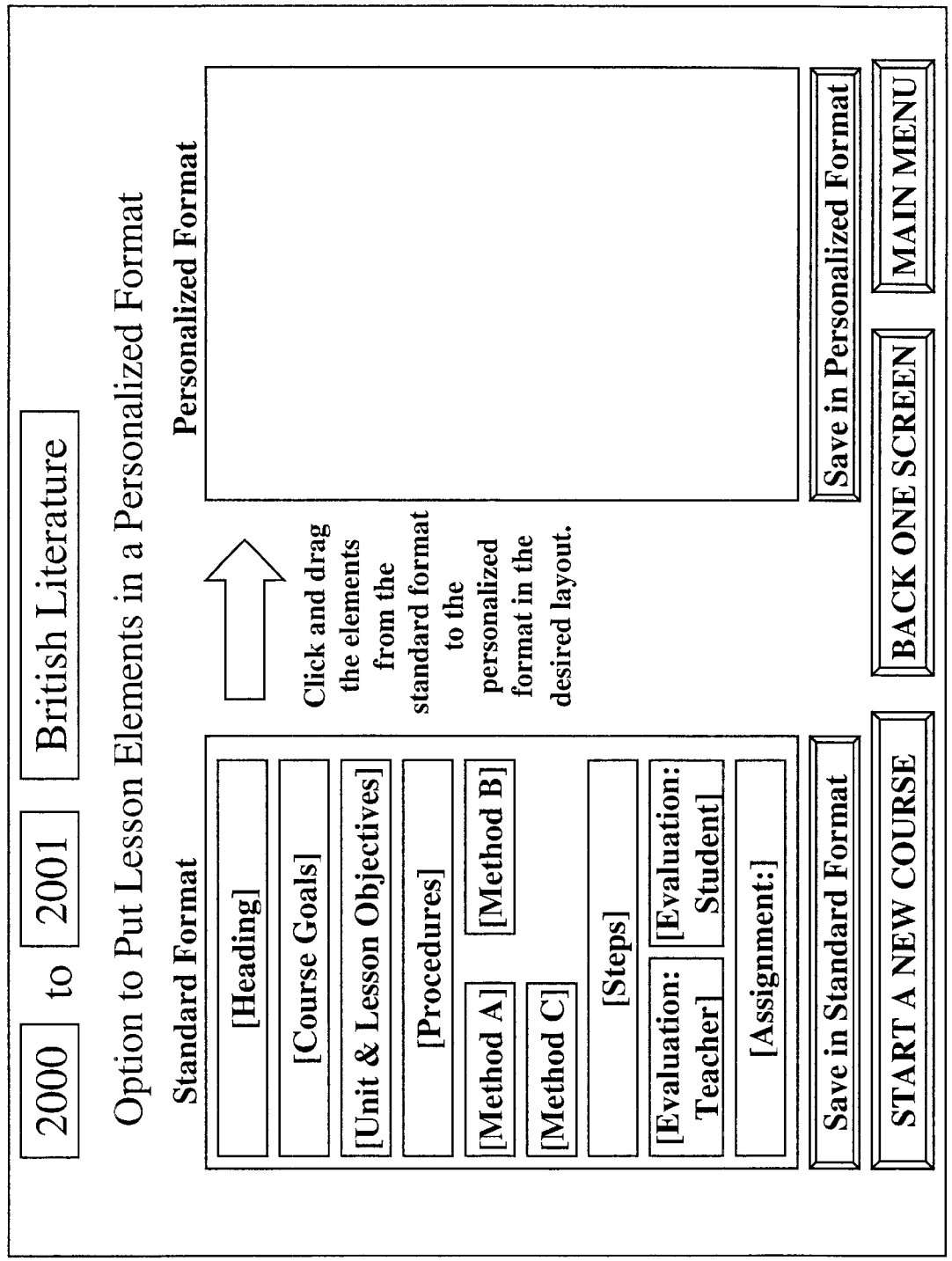
FIG. 23 is a schematic representation of a display screen showing a lesson plan display customization screen of the new course/subject creation process of the present invention.
Figure 24:
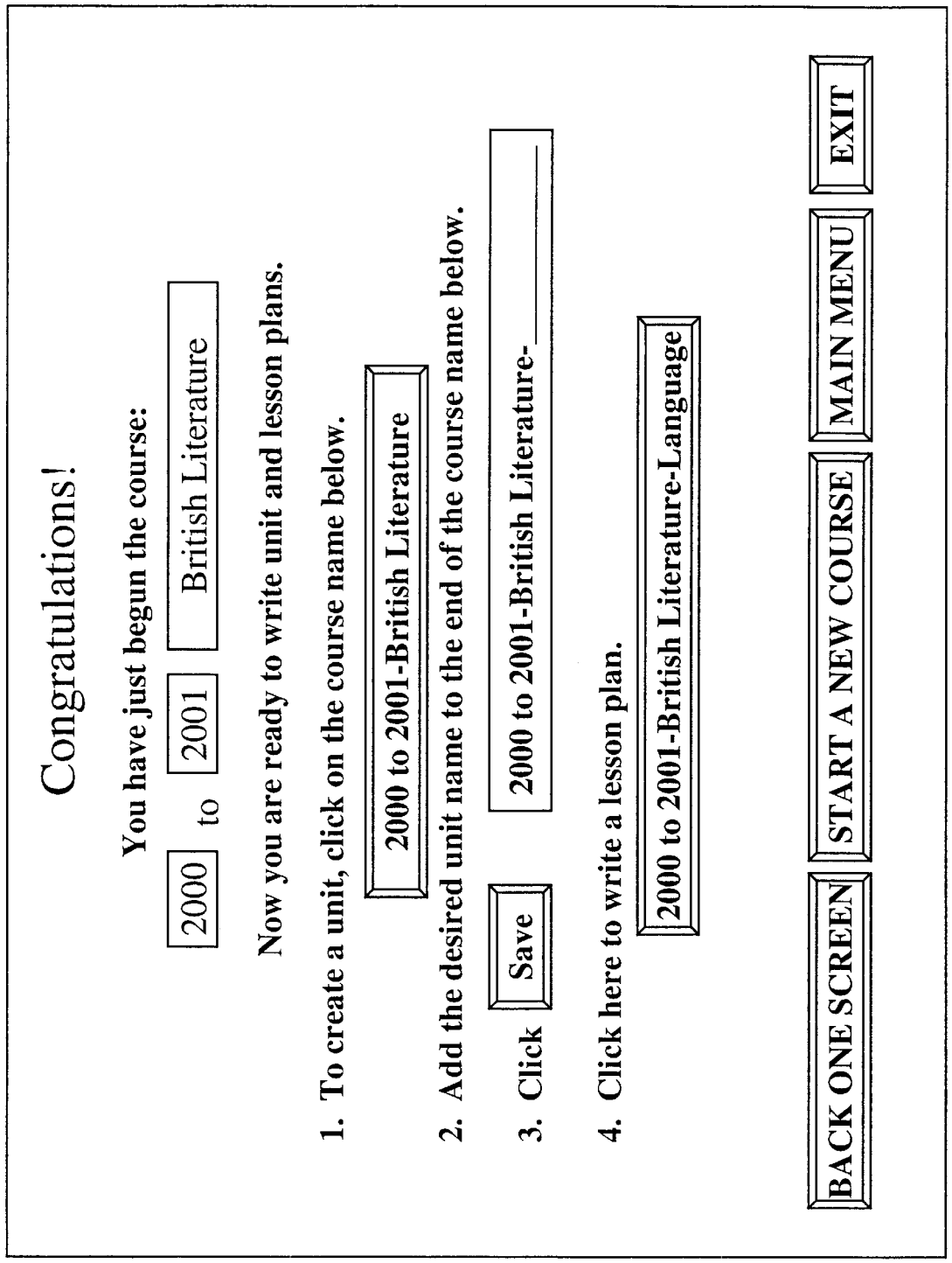
FIG. 24 is a schematic representation of a display screen showing a closing screen of the course/subject process of the present invention.
Figure 27:
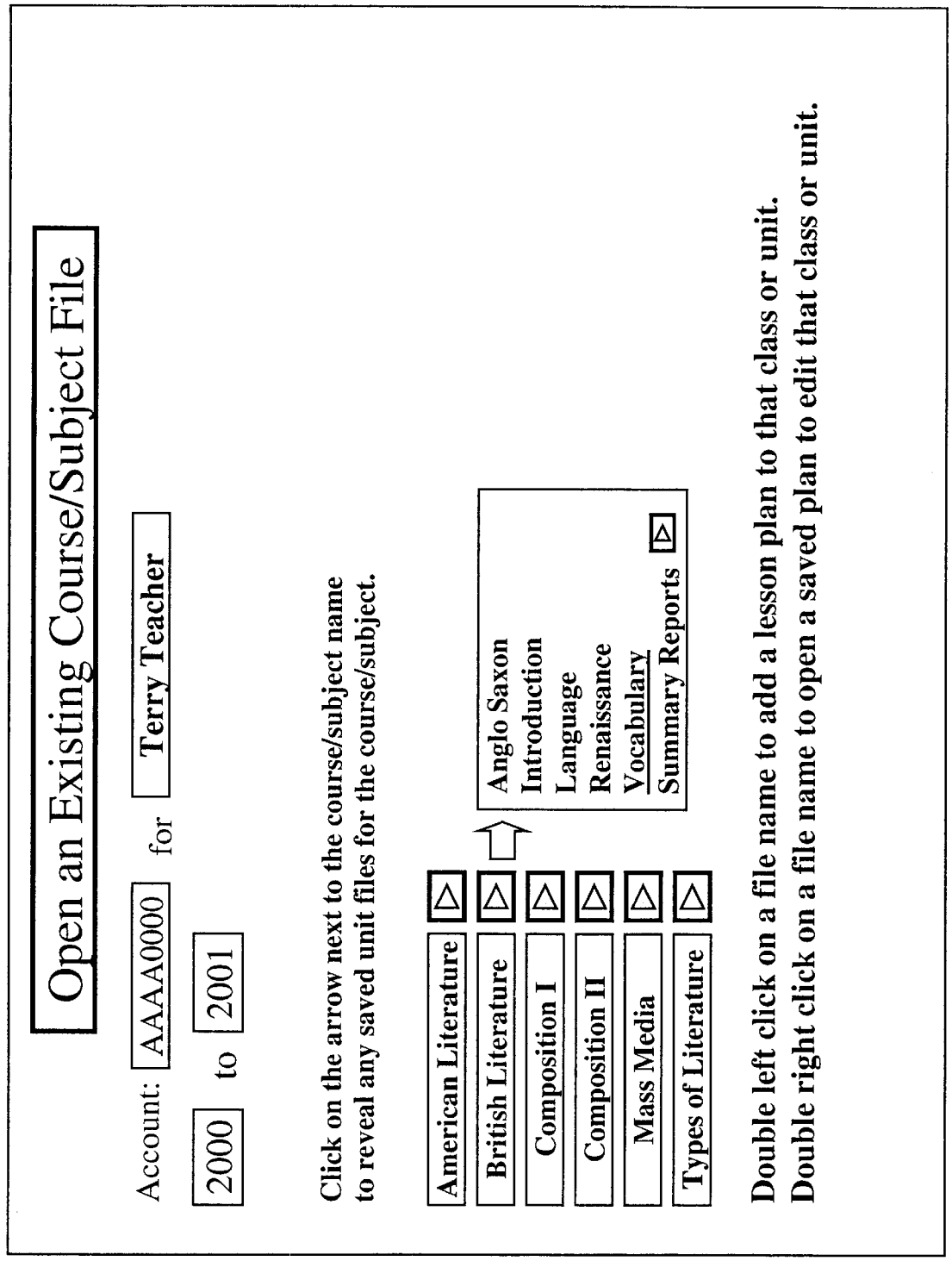
Figure 28:
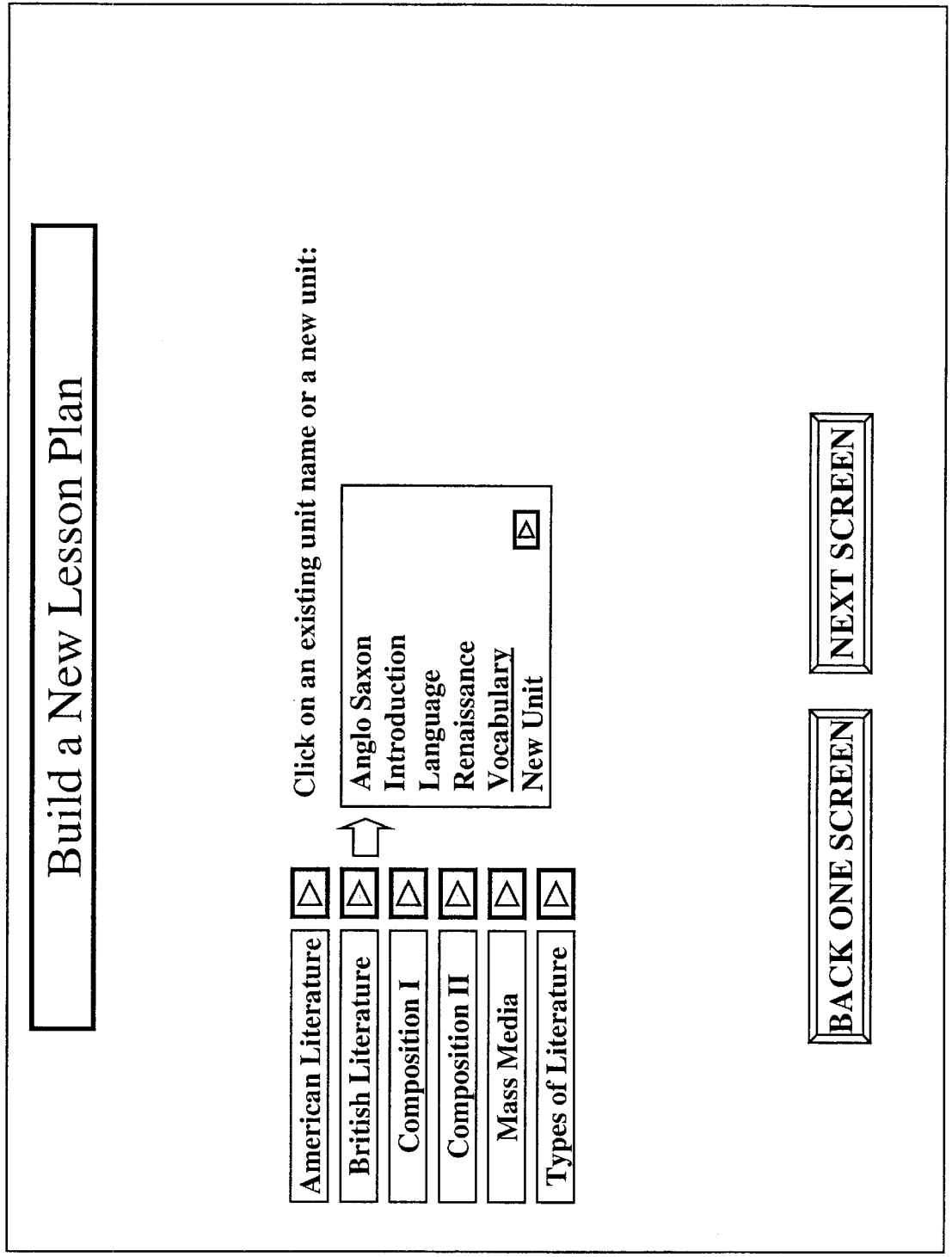

The opening menu presents a number of options that are made available to both registered users and unregistered users so that the opening menu is accessible to an audience broader than only registered (or authorized) users of the system (see FIGS. 1 and 12). This permits the network site to not only provide a convenient portal to registered users of the system, but also to provide a point where potential users may access certain parts of the system for demonstrating selected aspects of the system, and for providing a point for potential users to sign up for the service provided by the system. Features of the opening menu that are generally directed toward non-registered users include a preview of the service, a display of information about the service, a display of a preview of one or more accounts (or contracts) that may be set up to use the system, and an option for viewers to submit feedback. Further, the opening menu offers the option to open a new account, and thereby permit the user access to the features of the system available generally only to registered users upon registration.

With respect to the option of the opening menu regarding a preview of the service provided by the system, upon selection of such option the user may be presented with a preprogrammed slideshow comprised of screens showing samples of the various aspects of the system, such as a demonstration of the steps of lesson plan formation and summary report generation. This slideshow may be primarily directed to the educator or instructor user, and the tasks that would be performed by the instructor, although aspects of the service directed to usages by supervisory administrator users may also be included. Once the slideshow is completed, the user is given the option to return to the opening menu to make a further selection from the menu.

With respect to the option of the opening menu regarding viewing information about the service provided by the system, upon selection of such option, the user may be presented with a preprogrammed slideshow comprised of screens describing various aspects of the system, including the feature of the system that permits supervisory administrators to access lesson plans of instructor users and generate summary reports based on the lesson plans of the instructors utilizing the system. The user may be provided with the opportunity to request further information (such as, for example, information sent to the user by conventional mail or electronic mail). Once the slideshow is completed, and any information desired by the user has been requested, the user is given the option to return to the opening menu to make a further selection from the menu.

With respect to the option of the opening menu regarding viewing an account or contract for the system, upon selection of such option, the user is requested by the system to enter an account or contract identifier, and the system shows the text of the contract or agreement associated with the particular account or contract identifier supplied by the user. The user is then given the option to return to the opening menu to make a further selection from the menu.

With respect to the option of the opening menu regarding submitting feedback to the system or service provider, upon selection of such option, the user may be presented with a window for entering feedback text, and then is given the option to submit the feedback to the system or service provider. The user is then given the option to return to the opening menu to make a further selection from the menu.

With respect to the option of the opening menu regarding opening a new account, upon selection of such option, the system executes a routine (see FIGS. 10 and 11) that governs the setting up of a new account discussed below.

Optionally, the opening menu may provide the user with a means for exiting from the opening menu of the system, and the user is logged off of or removed from the opening menu.

With respect to the option of the opening menu regarding opening an existing account, upon selection of such option, the user is able to access the main menu of the system (see FIGS. 2 and 13) after providing identifying information to the system so that access to the main menu is limited to those users able to show that they are authorized individual users, or members of an authorized group of users. The user is preferably prompted to enter an account number (or other unique identifier) assigned to that user's personal account, and a password that is unique to the registered user may also be required as a further security measure. Optionally, if the user fails to supply the correct password after one or more incorrect tries, the system may have a provision for reminding the user of the appropriate password, such as by the use of a predetermined question and answer selected by the user at the initial set up of the user's account, and presumably known only by the user. In this option, the system may present the user with the predetermined question, and request the user to provide the correct, and predetermined, answer. If the question is correctly answered, the system may provide the user with the correct password information corresponding to the account number entered by the user previously.

Upon satisfactory entry of the account and password information, the system presents the user with the main menu of options for the system. The system may also display the time period remaining for the account corresponding to the account number that the user entered during the logon procedure. The main menu presents the user with a number of options, including revising an existing service contract, starting a new course/subject, opening filed documents, building a new lesson plan, and creating a summary report. If the user selects the option to revise an existing service contract, the system executes a routine (see FIGS. 10 and 11) that governs the setting up of new and revising existing contracts. If the user selects the option to start new course/subject, the system executes a routine (see FIGS. 8 and 9) that governs the setting up of files for a course/subject that has not been previously set up on the system for the user. If the user selects the option to open filed documents, the system executes a routine (see FIG. 3) that governs the opening and amending of existing lesson plans saved on the system for one or more established course/subjects. If the user selects the option to build a new lesson plan, the system executes a routine (see FIG. 4) that governs the formation of a new lesson plan under an existing (previously set up) course/subject. If the user selects the option to create a summary report, the system executes a routine (see FIG. 6) that governs the formation of a summary report from information saved on the system for that particular user.

In the routine governing the opening and amending of existing lesson plans saved on the system for one or more established course/subjects for the user (see FIGS. 3 and 27), the system presents the user with the names and/or titles of courses, subjects, and units having saved files on the system. The user is prompted to select one of the displayed courses, subjects or units that is desired to be opened. Once the desired course, subject, or unit is selected, any saved lesson plans for that course, subject, or unit are then displayed (preferably by name). The system then presents the user with a number of options, preferably including the opening of a saved lesson plan and the building of a new lesson plan. If the user selects building a new lesson plan within one of the selected existing course/subject/units, the system executes the routine (see FIGS. 4 and 27 through 31) that governs the formation of a new lesson plan. If the user selects the option to open an existing saved lesson plan, the system may display the name of the course/subject and any units with saved lesson plans. The system also may display any goals, objectives, procedures, and other elements of the saved lesson plan. The user is then given the option to add to or change any of the course goals, objectives, procedures, methods used, steps, materials, evaluations, assignments, and notes on success of the saved lesson plan. Once the user has completed any desired changes or additions to the lesson plan, the system executes a routine (see FIG. 5) that governs previewing and printing of lesson plans.

When the user selects the option to build a new lesson plan, the system executes a routine (see FIGS. 4 and 27 through 31) that preferably presents a number of options for forming a new lesson plan from those options. The system displays any courses or subjects that have saved files on the system. Hereinafter, for the purposes of this description, a course or subject may be collectively referred to as instructional classes, or classes. The instructor user is prompted to select the appropriate school term for the lesson plan to be created and is also prompted to select the appropriate course or subject for the new lesson plan. The system displays any saved units for the course or subject that the user has selected, and the user is provided the option of selecting one of the saved unit names, or entering a new unit name. The user is given the option to display the list of available class goals and is prompted to select one or more course goals for the new lesson plan to be created. The user is also given the option to display the list of objectives available for the new lesson plan, and preferably the listing of objectives are taken from those objectives previously saved for the class for which the new lesson plan is being added. The instructor user is prompted to select one or more objectives for the new plan. The system may then display the selected term, the class, and the unit name for the new lesson plan. The user may be provided with the option to enter any desired reminders for the user to be included in the lesson plan. The instructor user is given the option to display the list of available teaching methods, and is prompted to select one or more of the methods for the new lesson plan. The user may also be permitted to enter any desired steps for executing the new lesson plan.

The system may also provide the user with the option to include in the new lesson plan any instructor materials and any student materials that are needed for the new lesson plan. The system also provides the user with the option to include any teacher evaluation techniques desired for the new lesson plan, and also any student evaluation techniques for the new lesson plan. The system provides the user with the opportunity to include any student assignments corresponding to the new lesson plan, and the user is also provided the opportunity to include any desired notes on the observed success all the lesson plan. The system may then execute the routine (see FIG. 5) for previewing and printing the new lesson plan.

Figure 5:
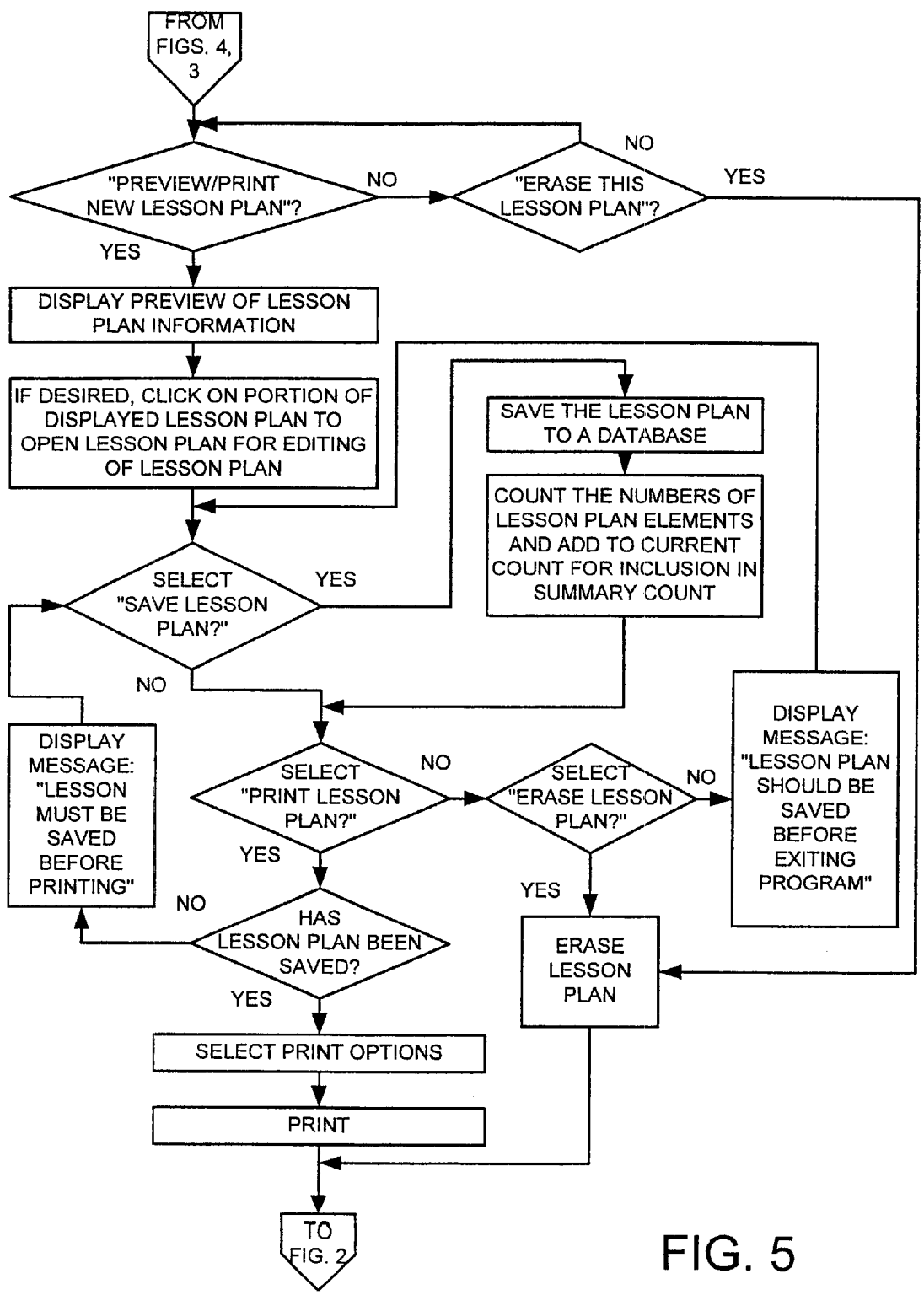
FIG. 5 is a schematic flowchart of an aspect of the system permitting the previewing and printing of lesson plans on the system by the user.
Figure 6:
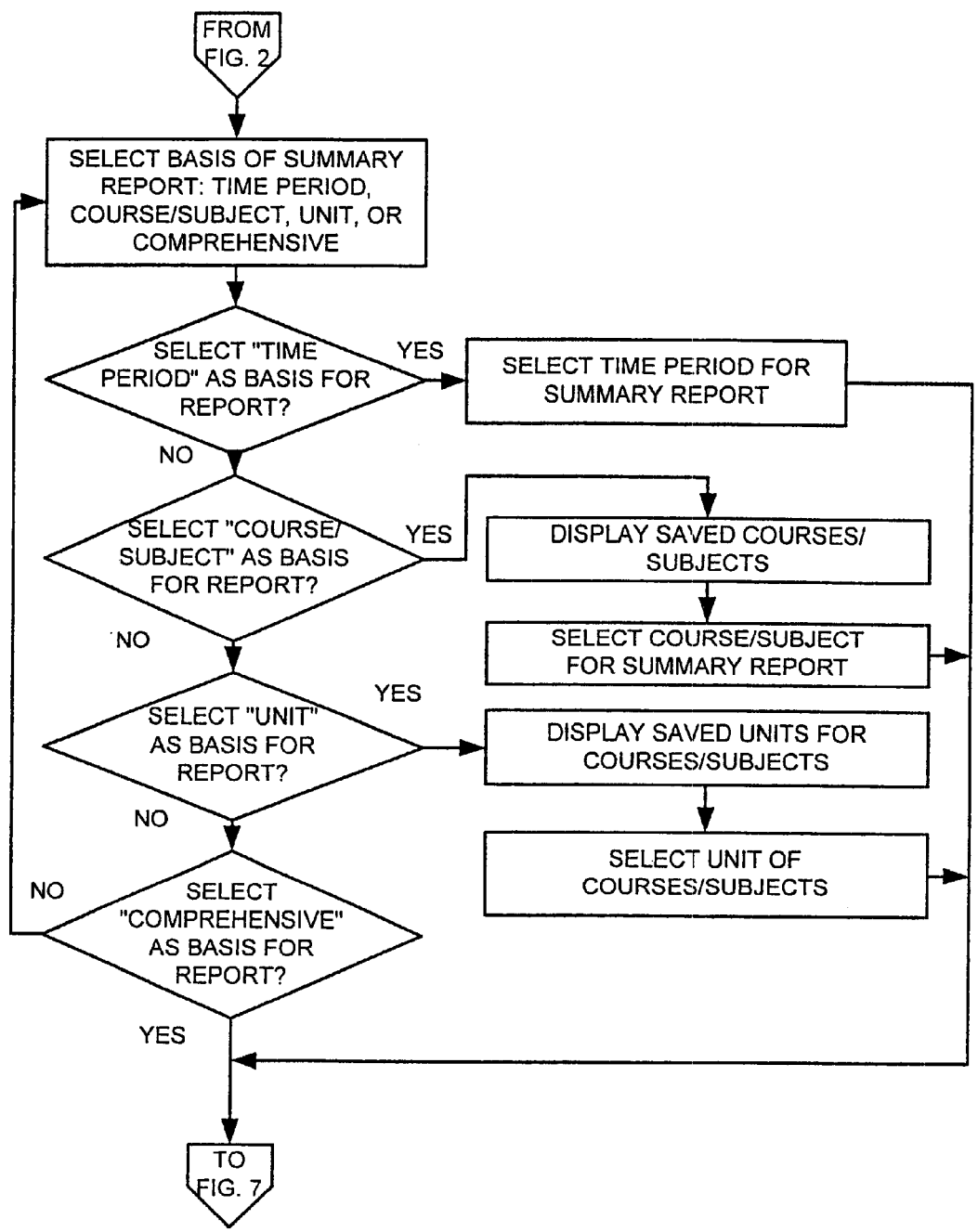
FIGS. 6 and 7 are schematic flowcharts of an aspect of the system permitting the creation of a summary report summarizing multiple lesson plans of a user, or multiple users within a group.

In the routine for previewing and printing lesson plans, the instructor user is presented with the option to preview and/or print the lesson plan which has previously been selected by the user (see FIG. 5). The system may also provide the user with the option to erase the lesson plan from the system. If the user indicates that erasure of the lesson plan is desired, the lesson plan is erased or otherwise deleted from the system and the system returns to the main menu (see FIG. 2). If the user indicates the desire to print or preview the lesson plan, the system displays a preview of the lesson plan information that is saved on the system. Optionally, the system may provide the user with the option of clicking (such as with a pointer device) on a portion of the displayed lesson plan, and the indicated portion of the lesson plan is opened for any desired editing of the lesson plan. The user is then provided with the option to save the lesson plan, and if the user indicates a desire to save the lesson plan, the lesson plan is saved on the system database.

In conjunction with saving the lesson plan to the system database, a count of the number of lesson plan elements is performed and the number of lesson plan elements is added to the current counts in the database for inclusion in a summary count of elements (for purposes such as generating any summary reports). If the user indicates that saving the lesson plan is not desired, the system presents the user with the option to print the lesson plan. If the user indicates that printing the lesson plan is not desired, the system queries the user whether the lesson plan should be erased. If the user indicates that the lesson plan should not be erased, the system displays a message that the lesson plan should be saved before exiting the program, and returns the user to the earlier query regarding saving the lesson plan. If the user indicates that the lesson plan should be erased, the lesson plan is erased on the system and the user is returned to the main menu. If the user indicates the desire to print the lesson plan, the system determines whether the lesson plan has been saved. If a lesson plan has not been saved the system displays a message indicating that the lesson plan must be saved before printing, and the system returns the user to the earlier query regarding saving the lesson plan. If the lesson plan has been saved, the user is prompted to select print options and printing of the lesson plan is performed. The system then returns to the main menu (see FIG. 2).

In the routine for generating a summary report (see FIGS. 6 through 7 and 25 through 26), the system prompts the user to select the basis for generating a summary report. Preferably, the bases include a particular time period, a particular class, or a comprehensive basis. If the user selects a time period for the basis of the summary report, the user is prompted to select the particular time period for the summary report. If the user selects a class (e.g., course or subject) as the basis for the summary report, the system displays all saved classes for the user, and the user is prompted to select the class for the summary report. If the user selects a unit as the basis for the summary report, the system displays all saved units for the classes of the user, and the user is prompted to select a unit of these courses/subjects for the summary report. The user is also provided with the option to select a comprehensive basis for the summary report.

Figure 7:
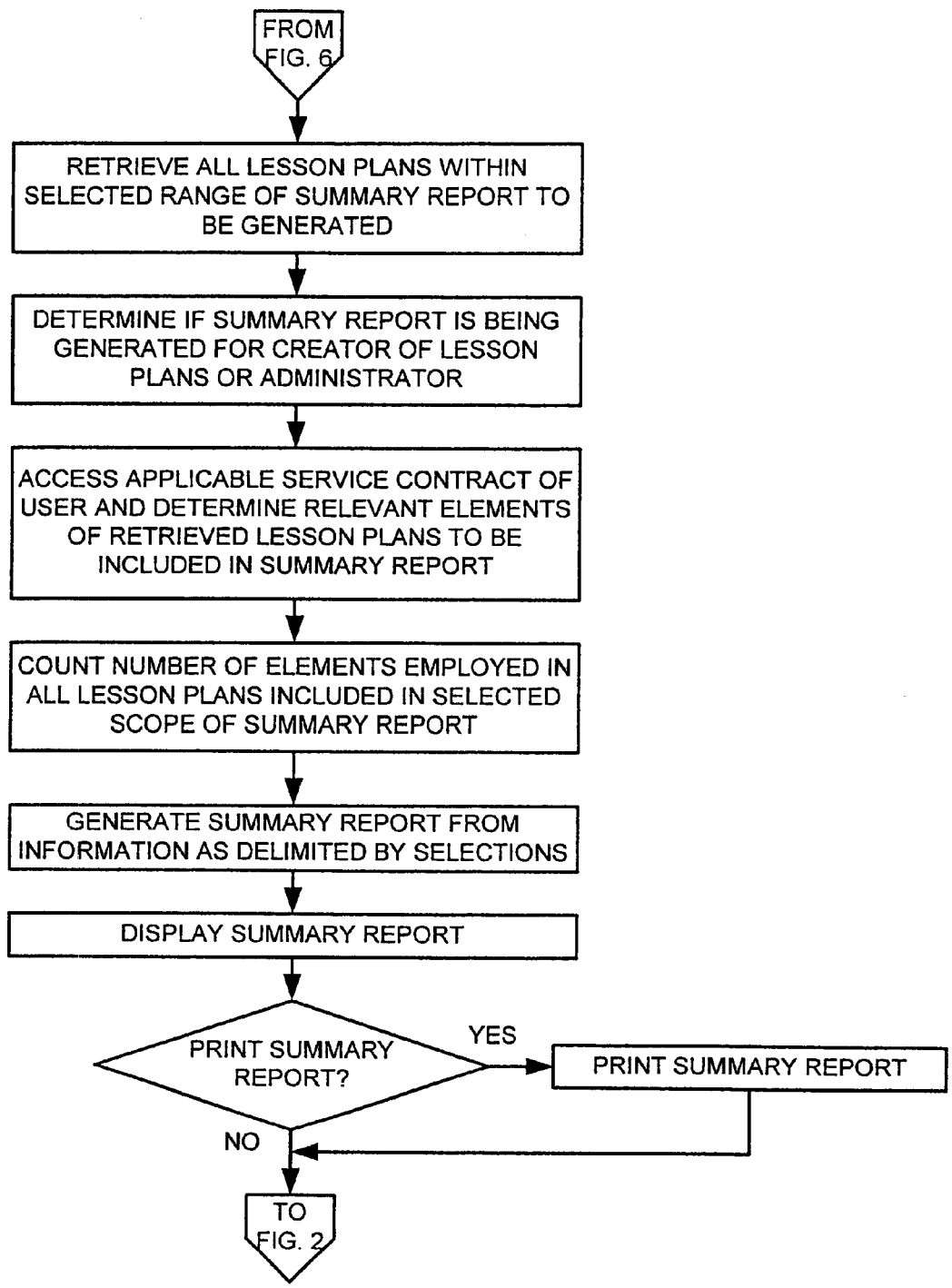
Figure 8:
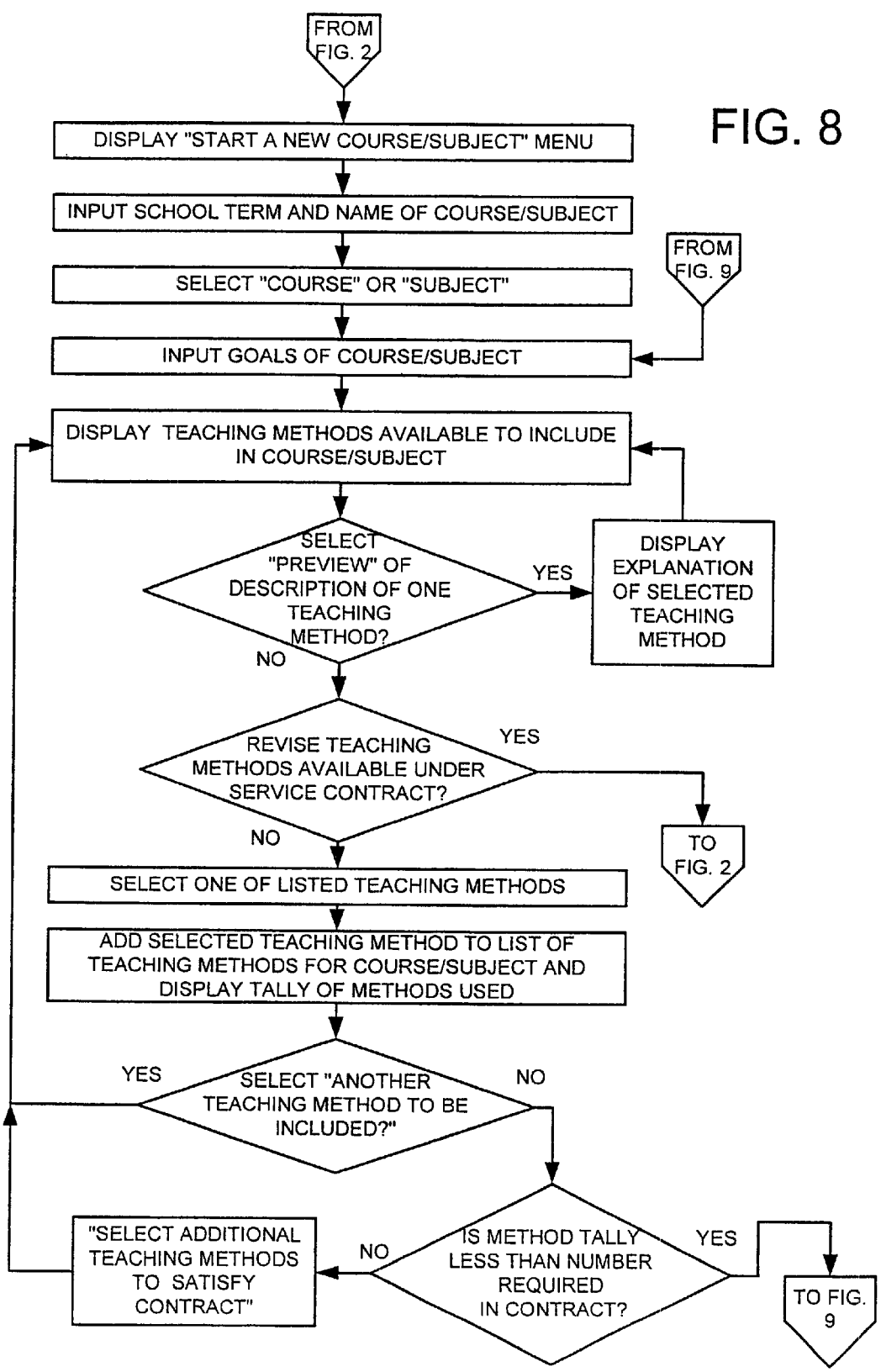
FIGS. 8 and 9 are schematic flowcharts of an aspect of the system permitting creating of a new course/subject file.
Figure 9:
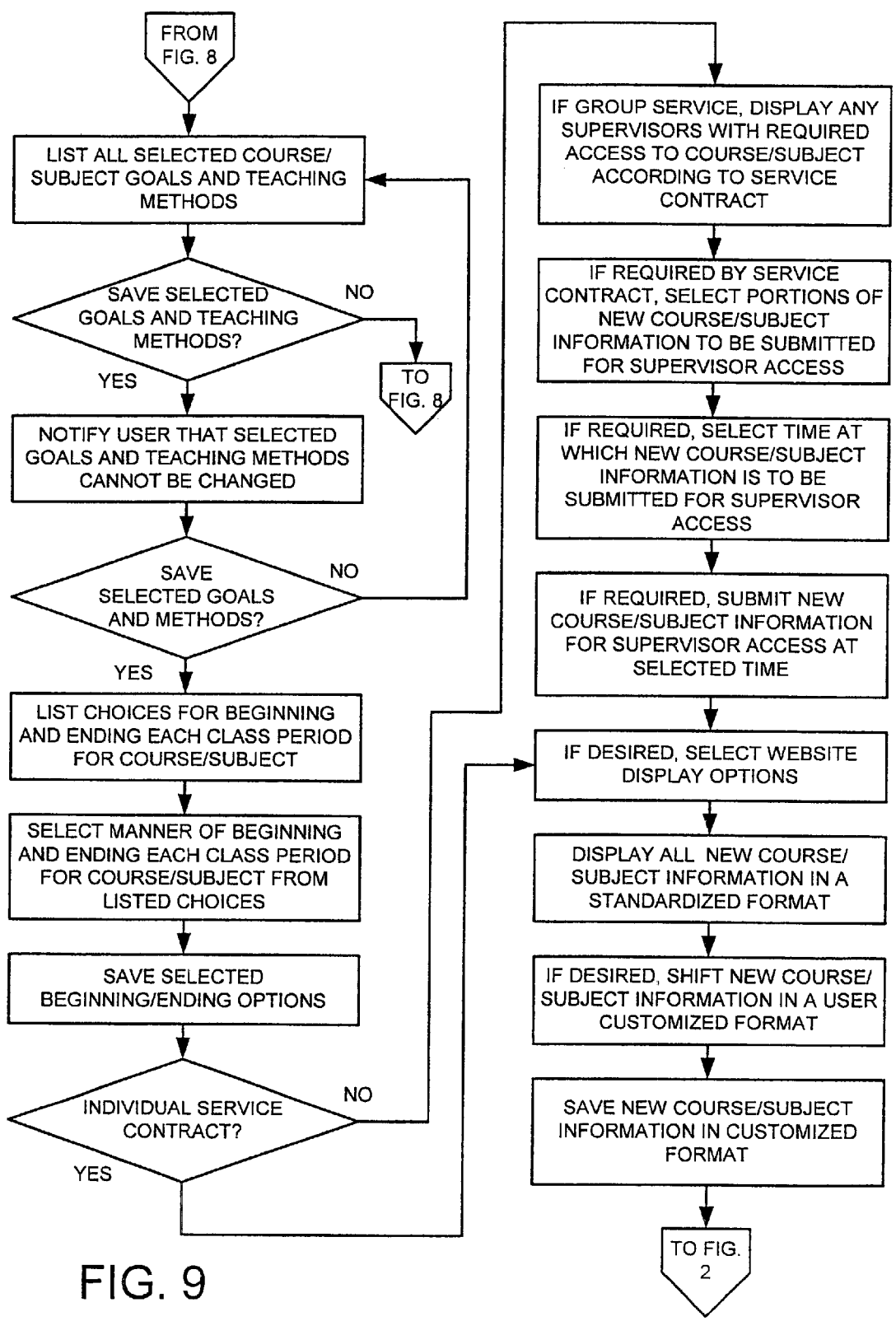
Figure 10:
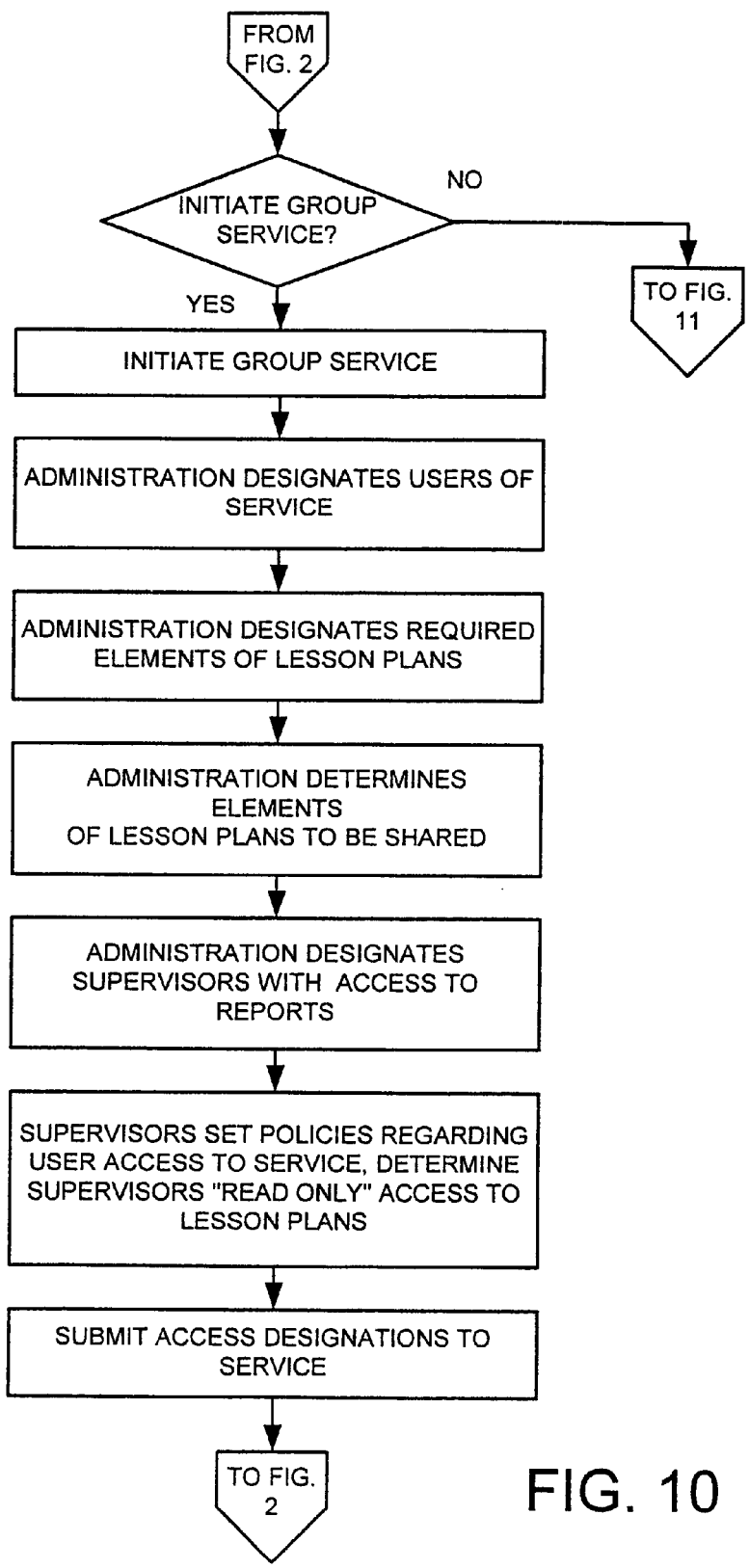
FIG. 10 is a schematic flowchart of an aspect of the system permitting initiation of a group service account for a group of users.
Figure 11:
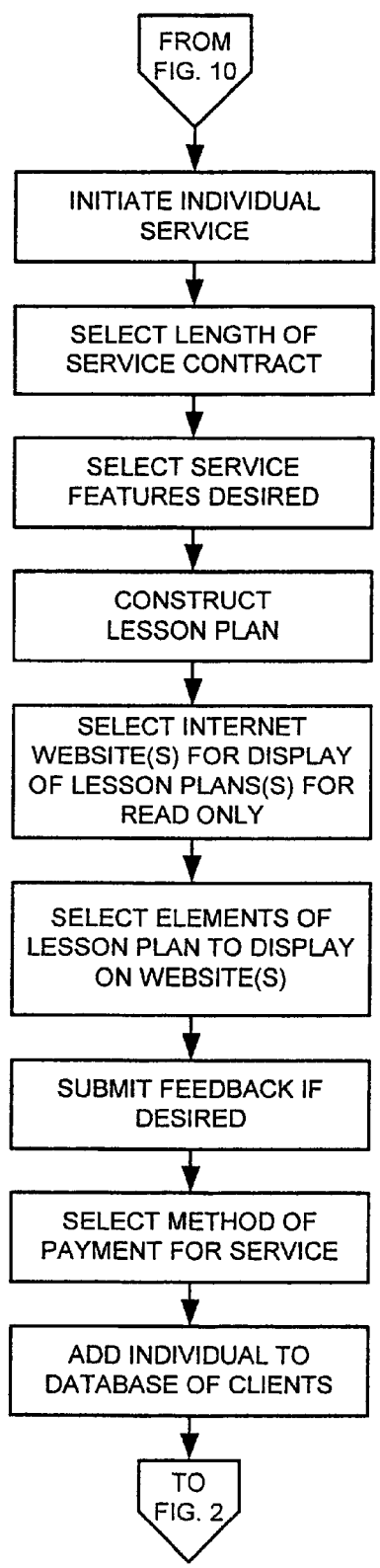
FIG. 11 is a schematic flowchart of an aspect of the system permitting initiation of an individual service account for a user.

The system retrieves all lesson plans within the range selected by the user for the summary report to be generated (FIG. 7). The system determines if the summary report is being generated by an instructor user (or creator of the lesson plans) or by a supervisory administrator user. To do this, the system may access the applicable service contract of the user and determine relevant elements of the retrieved lesson plans that are to be included in the summary report based upon the access available to the user requesting the report. The system then counts the number of elements employed in all lesson plans (or retrieves previously saved element counts) that are included in the selected scope of the summary report, and generates a summary report from the information as delimited by the user's basis selections. The system displays the summary report and the user is given the option to print the summary report. If the user selects the option of printing the summary report, the report is printed. The system then returns to the main menu (see FIG. 2).

In the routine for starting a new course or subject (see FIGS. 8 through 9 and 15 through 24), a menu may be displayed with the options and factors for starting a new course or subject (class) on the system. The user is prompted to input a school term and a name of the class, and to select whether this new class file is directed to a course or a subject. The user is prompted to input the goals of the new class. The system then displays the teaching methods that are available to be included in the class, which may be affected by the contract terms of the account of the user or the user's particular group. The system provides the user with the option to preview descriptions of the available teaching methods. If the user indicates that display of a description is desired, the system displays an explanation of the selected teaching methods, and then the user may read the explanation of the available teaching methods. For the purposes of illustration, the teaching methods may include one known as Bloom's taxonomy, which may include constituents such as evaluation, synthesis, analysis, application, comprehension, and knowledge. Another teaching method that may be provided is known as circles of courage, which may include constituents such as belonging, independence, mastery, generosity, and the like. Another teaching method that may be provided is known as learning styles, which may include constituents such as sensing/thinking, sensing/feeling, intuiting/thinking, and intuiting/feeling. Another teaching method that may be provided is known as multiple intelligences, which may include constituents such as linguistic, logical/mathematical, spatial, bodily/kinesthetic, musical, interpersonal, and intrapersonal. Another teaching method that may be provided is known as multiple talents, which may include constituents such as productive thinking, communication, forecasting, planning, and decision making. Another teaching method that may be provided is known as elements of character.

The user may be given the option to revise the available teaching methods under an individual service account on the system for the particular user, but this option is generally not available to instructor users covered by a group account. If the user indicates the desire to revise the available teaching methods, the system returns to the main menu (FIG. 2) where that option is provided. If no revision of the service contract is desired, the user is prompted to select one of the listed teaching methods to be included in a new class. Once a teaching method has been selected, the method is added to the listed teaching methods for that class. The system may display a tally of the teaching methods that have been included in this particular class. The system provides user with the option of adding additional teaching methods to the class, and if the user indicates a desire to add additional methods, the system may redisplay the available teaching methods. If the user indicates that no further teaching methods are to be included in the new class, the system determines whether the tally of teaching methods chosen for the new class is less than the number of teaching methods required in the contract covering the instructor user. If the number of teaching methods chosen for the new class is less than the required number of methods in the contract of the group account, the system prompts the user to select additional teaching methods for inclusion in the class in order to satisfy the user's contract. If the number of teaching methods included is equal to or greater than the required number of methods in the contract, the system permits the user to continue with the establishment of the file for the new class.

The system may display or list the selected class goals and teaching methods that the user has previously selected. The instructor user is provided with the option of saving the selected goals and teaching methods. If the user indicates that the selected goals and teaching methods should not be saved, the user is returned to the portion of routine where the goals for the class are to be selected. If the user indicates that the goals and teaching methods should be saved, the user is notified that once saved, the goals and teaching methods cannot be changed for the class. The system may again prompt the user to indicate whether the selected goals and teaching methods should be saved. If the user indicates that the selected goals and methods should not be saved, the selected goals and teaching methods are redisplayed for the user and the user is again queried as to whether the goals and teaching plans are to be saved. If the user indicates that the selected goals and methods should be saved, they are saved to the system database.

If the user is covered by a group service contract, the system displays the names of any supervisory administrator users with contract-required access to the certain information of the class file under the contract. If so required by the service contract, the user is prompted to select the portions of the new class information that are to be made available for administrator user access. Also, if required, the user is prompted to select the time at which the new class information is to be submitted to the supervisor. Further, if required, the system prompts the user to formally submit the class information to the appropriate supervisory administrator.

Figure 2:
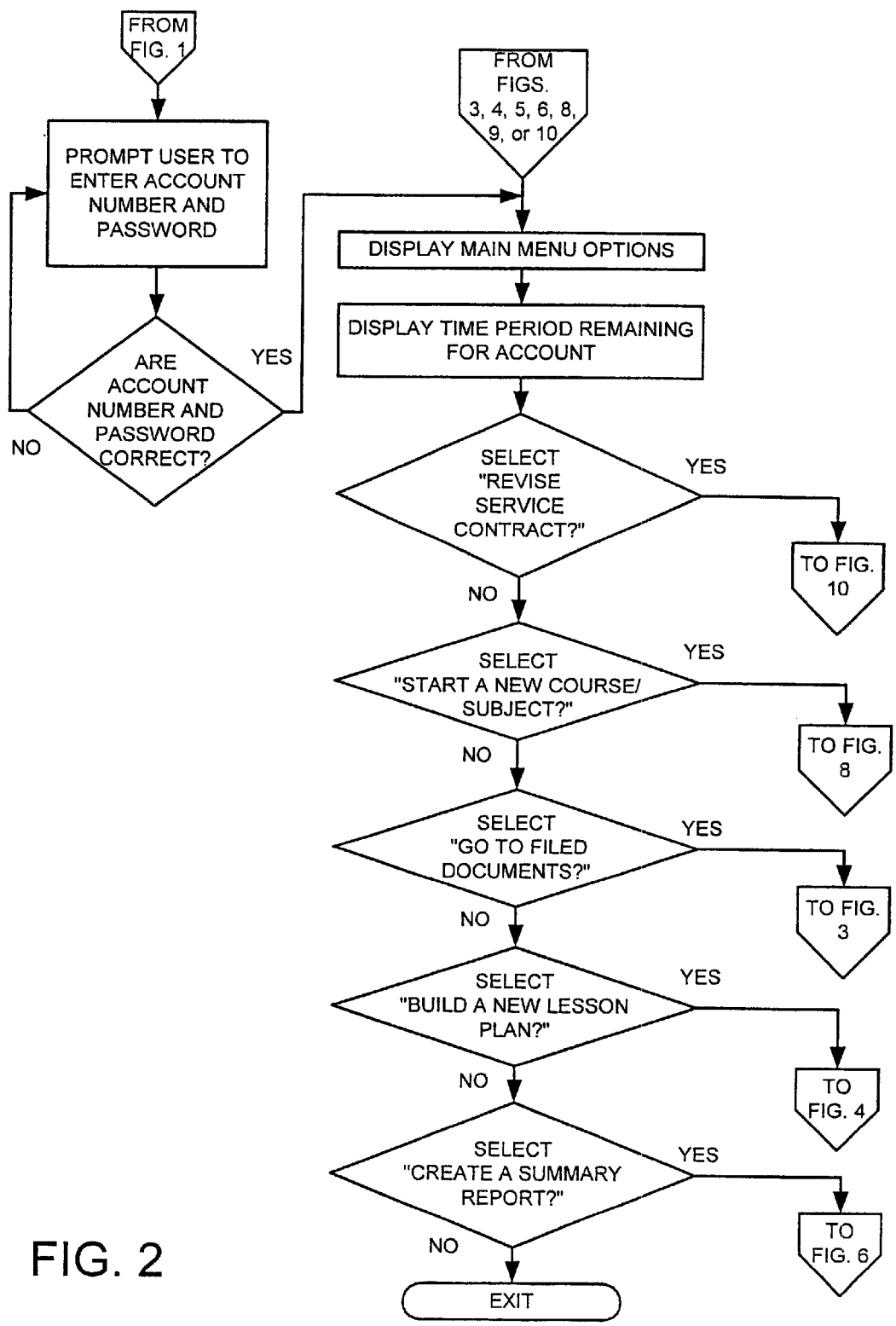
FIG. 2 is a schematic flowchart of a main menu for the system of the invention particularly illustrating aspects of the system available to registered users.
Figure 3:
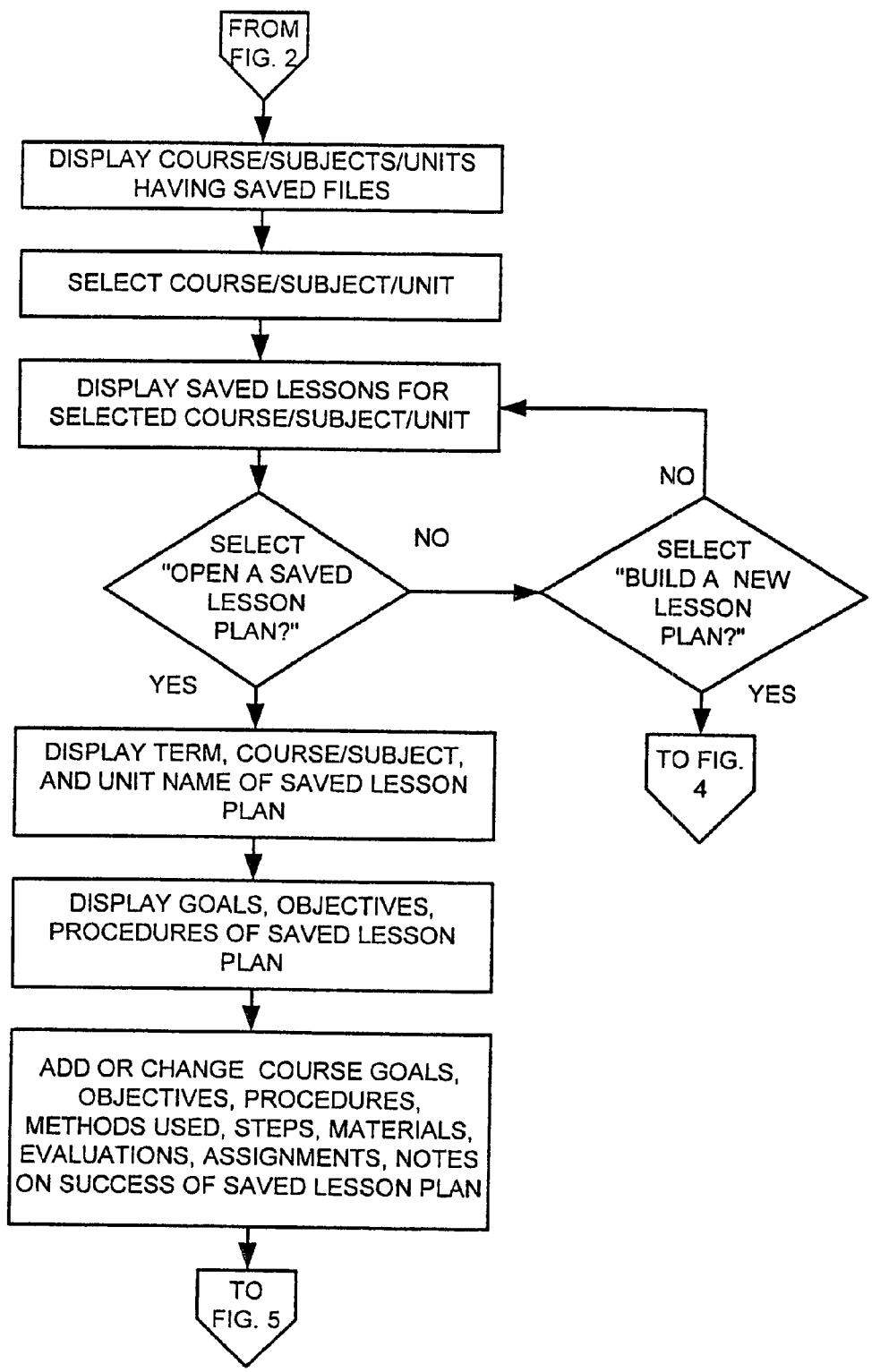
FIG. 3 is a schematic flowchart of an aspect of the system permitting the opening of existing user lesson plan files on the system.
Figure 4:
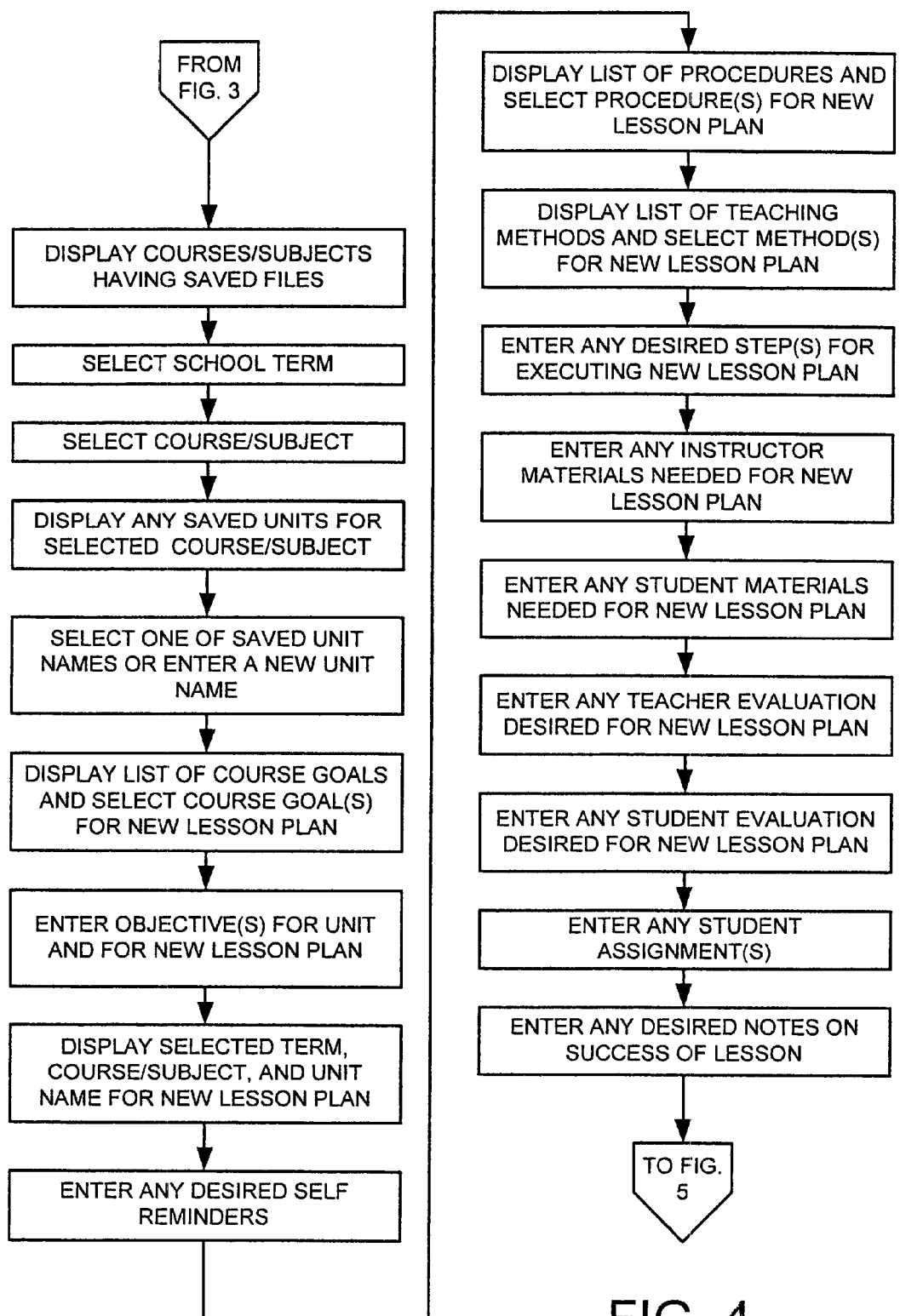
FIG. 4 is a schematic flowchart of an aspect of the system permitting the creation of new lesson plan files on the system by a user.

If the user has an individual service contract, and for group service contract users who have completed the supervisory administrator access steps, the system inquires whether the user desires to place portions of the new class information on a network site for access, such as, by students, and permits the user to select from various network site display options. The new class information is then displayed in a standardized format, and the user is then permitted, if desired, to shift the new class information into a user-customized format for display. The new class information is then saved on the system in the customized format. The system then returns to the main menu (FIG. 2).

In the routine for creating a new service contract, or account, the system initially determines from the user attempting to set up the account whether the account will cover an individual or a group (such as, for example, teachers within a school or school district). If the user desires an individual account, the system executes a routine (see FIG. 11) directed to individual service accounts. If user desires a group service account, the system executes a routine (see FIG. 10) directed to determining the characteristics of a group service account. Typically, a group service account will be set up by an administrator of the group, and so the user in this case is usually an administrator. The system prompts the user to designate the individual users of the service under the group account. The system also prompts the user to designate elements that are required to be included in the individual instructor's submitted lesson plans. The administrator user also designates which elements of the instructor user's lesson plans that are to be shared with supervisory administrator users. The system then prompts the administrator user to designate the names of supervisory administrator users who are to have access to reports generated from the lesson plans of the instructor users covered by the group account. The supervisory administrator users with access to the system may also be permitted to set policies regarding instructor user access to the system under the group account. It should be understood that supervisor access to lesson plans is preferably limited to a read-only basis, so that administrator users are prevented from directly changing the instructor user's lesson plans saved on the system. The administrator user then submits the access designations and characteristics for being administered by the system. Instructor users covered by the group account are then permitted by the system to sign up for the service by providing the user's name, school, and other identifying information such as, for example, a selected password. The system adds the user and access information to the database as part of a group account. The instructor users are then free to use the system as desired, including the instructional class file creation features, the lesson plan file creation features, the summary reports features, and administrator users are permitted to selectively access the information created by these features as permitted by the group account information and terms of the group service contract. After the group service account has been created by the above routine, the user is returned to the main menu (FIG. 2).

In the routine directed to the creation of an individual service contract (see FIG. 11), the individual user is prompted to select the desired length of the service contract for the individual account. The user is also prompted to select the service features of the system that are desired to be included under the service contract. In the individual account, the user is able to construct a lesson plan, and has the option to select a network site (such as, for example, an Internet site) to provide general access to lesson plans. If such access is desired, the user selects elements of the lesson plan for being displayed on the network site, preferably for read only access. The system permits the individual user to submit feedback about the service if desired. The individual user then may select a method of payment for the individual service. The system then adds the individual account information to the database of clients with individual service contracts. The system then returns to the main menu (FIG. 2) for providing the new individual user various options available on the main menu.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for generating and monitoring instructional plans of instructors, comprising:

account creation means for creating an account file on a database according to setup information provided by a user, the account file including account information;

class file creation means for creating a class file on the database for an instructional class covering a course or subject as initiated by an instructor user for the instructional class, the class file containing requirements for the course or subject;

assembling means for assembling an instructional lesson plan file for one of the instructional classes having a class file on the database; and report generating means for generating a summary report summarizing instructional lesson plans of the instructor user according to criteria based on reporting requirements of the group account covering the instructor user.

2. The system of claim 1 wherein the setup information of the account file includes an account type selected from the group including an individual account and a group account, the account file for the individual account including account information directing actions taken with respect to an individual user, the account file for the group account including account information directing actions taken with regard to a group of users, the setup information including core requirements for class files and lesson plan files in the account information for the group account, a listing of approved teaching methods available for use in the class files and the lesson plan files in the core requirements, a total quantity of approved teaching methods to be included in all of the lesson plan files of each class file created by users in the group in the core requirements for class files, reporting requirements for reporting elements of class files and lesson plans created on the system by instructor users to administrator users supervising the instructor user in the account information for a group account.

3. The system of claim 2 additionally including comparing means for comparing a total of approved teaching methods selected by the instructor user for the instructional class to a total quantity of approved teaching methods required by core requirements in the account information for a group account covering the instructor user, the comparing means informing the instructor user if the total of approved teaching methods selected for the class is less than the quantity required by the core requirements of the group account.

4. The system of claim 2 wherein the report generating means retrieves all lesson plans satisfying a selected basis of the summary report, accesses the account information for a group account covering the instructor user and determines elements of the retrieved lesson plans for inclusion in the summary report, counts elements of the retrieved lesson plans to be included in the summary report, and assembles counts of the elements into a summary report format.

5. A method for generating and monitoring instructional plans of instructors, comprising:

creating an account file on a database according to setup information provided by a user, the account file including account information;

creating a class file on the database for an instructional class covering a course or subject as initiated by an instructor user for the instructional class, the class file containing requirements for the course or subject;

assembling an instructional lesson plan file for one of the instructional classes having a class file on the database; and generating a summary report summarizing instructional lesson plans of the instructor user according to criteria based on reporting requirements of the group account covering the instructor user.

6. The method of claim 5 wherein the step of creating the account file includes requesting the setup information from the user regarding the type of account to be created, wherein an account is of a type selected from the group including an individual account and a group account, the account file for the individual account including account information directing actions taken with respect to an individual user, the account file for the group account including account information directing actions taken with regard to a group of users.

7. The method of claim 6 additionally comprising including core requirements for class files and lesson plan files in the account information for the group account.

8. The method of claim 7 additionally comprising including a listing of approved teaching methods available for use in the class files and the lesson plan files in the core requirements.

9. The method of claim 7 additionally comprising including a total quantity of approved teaching methods to be included in all of the lesson plan files of each class file created by users in the group in the core requirements for class files.

10. The method of claim 6 additionally comprising including reporting requirements for reporting elements of class files and lesson plans created on the system by instructor users to administrator users supervising the instructor user in the account information for a group account.

11. The method of claim 10 additionally comprising identifying in the reporting requirements a network site on which lesson plans must be displayed.

12. The method of claim 11 additionally comprising indicating in the reporting requirements a time period for which lesson plans must be displayed on the network site.

13. The method of claim 6 additionally comprising including core requirements for class files and lesson plan files in the account information for the individual account, and including a total quantity of approved teaching methods to be included in all of the lesson plan files of each class file created by users in the group in the core requirements for class files.

14. The method of claim 5 wherein the step of creating the class file includes requiring identification of at least one class goal for the instructional class.

15. The method of claim 5 wherein the step of creating the class file includes providing to the instructor user a listing of approved teaching methods from the account information of the account file of the group account, and requiring selection from the listing of approved teaching methods of at least one teaching method to be used in the instructional class.

16. The method of claim 15 wherein the step of creating the class file includes comparing a total of the approved teaching methods selected by the instructor user for the instructional class to a total quantity of approved teaching methods required by core requirements in the account information for a group account covering the instructor user, and informing the instructor user if the total of approved teaching methods selected for the class is less than the quantity required by the core requirements of the group account.

17. The method of claim 5 wherein the step of creating the class file includes preventing deletions of goals and teaching methods from the class file once the class file has been completed and saved to the database.

18. The method of claim 5 wherein the step of creating the class file includes providing a listing of activities to select from for starting and ending all lesson plans created for the instructional class.

19. The method of claim 5 wherein the step of creating the class file includes retrieving from the account information of a group account covering the instructor user reporting requirements for class files created by the instructor user, and identifying to the instructor user the reporting requirements applicable to class files created by the instructor user.

20. The method of claim 1 wherein the step of creating the class file includes indicating to the instructor user a time period from reporting requirements in the account information during which elements of an instructional lesson plan must be displayed on a network site, and prompting the instructor user to select a time relative to a date of the lesson plan for beginning display of the lesson plan on the network site.

21. The method of claim 20 wherein the step of creating the class file includes providing a listing of lesson plan elements available for displaying on the network site, and prompting the instructor user to select lesson plan elements for displaying on the network site.

22. The method of claim 5 wherein the step of creating the class file includes showing a standardized format for displaying lesson plan elements, and permitting the instructor user to create a customized format for displaying the lesson plan elements.

23. The method of claim 5 wherein the step of generating a summary report includes selecting a basis for summarizing lesson plans, the basis for summarizing lesson plans being selected from the group including all lesson plans for the instructor user during a specified time period, all lesson plans for a selected instructional class, all lesson plans for a selected unit of a selected instructional class, and all lesson plans for the instructor user.

24. The method of claim 23 wherein the step of generating a summary report includes retrieving all lesson plans satisfying the selected basis of the summary report.

25. The method of claim 24 wherein the step of generating a summary report includes counting elements of the retrieved lesson plans to be included in the summary report.

26. The method of claim 25 wherein the step of generating a summary report includes assembling counts of the elements into a summary report format.

27. The method of claim 5 wherein the step of generating a summary report includes determining if a user requesting the summary report is the instructor user or an administrator user supervising the instructor user.

28. The method of claim 5 wherein the step of generating a summary report includes accessing the account information for a group account covering the instructor user and determining elements of the retrieved lesson plans for inclusion in the summary report.

29. The method of claim 5 wherein the step of assembling an instructional lesson plan file including:
   displaying names of instructional classes of the instructor user having class files saved on the database;
   requiring the instructor user to select one of the instructional classes of the instructor user having class files saved on the database;
   displaying names of any saved units for the instructional class selected by the instructor user;
   requiring the instructor user to select one of the saved units for the instructional class or permitting the instructor user to enter a name of a new unit;
   displaying a listing of the class goals from the class file for the instructional class and permitting the instructor user to select at least one class goal from the listing of class goals;
   requiring identification of at least one unit objective and at least one lesson objective;
   displaying a listing of procedures for the lesson plan and permitting the instructor user to select at least one of the procedures; and
   displaying a listing of approved teaching methods and permitting the instructor user to select at least one of the teaching methods from the listing of approved teaching methods.

30. A method for generating and monitoring instructional plans of instructors, comprising:
   creating an account file on a database according to setup information provided by a user, the account file including account information, the step of creating the account file including:
      requesting the setup information from a user regarding the type of account to be created, wherein an account is of a type selected from the group including an individual account and a group account, the account file for the individual account including account information directing actions taken with respect to an individual user, the account file for the group account including account information directing actions taken with regard to a group of users;
      wherein the account information for a group account includes core requirements for class files and lesson plan files;
         wherein the core requirements for class files and lesson plan files includes a listing of approved teaching methods available for use in the class files and the lesson plan files;
         wherein the core requirements for class files includes a total quantity of approved teaching methods to be included in all of the lesson plan files of each class file created by users in the group;
         wherein the account information for a group account includes reporting requirements for reporting elements of class files and lesson plans created on the system by instructor users to administrator users supervising the instructor user, wherein the reporting requirements including identifying a network site on which lesson plans must be displayed, indicating a time period for which lesson plans must be displayed on the network site;
   creating a class file on the database for an instructional class covering a course or subject as initiated by an instructor user for the instructional class, thee class file containing requirements for the course or subject, the step of creating the class file including:
      requiring identification of at least one class goal for the instructional class;
      providing to the instructor user the listing of approved teaching methods from the account information of the account file of the group account, wherein the providing step includes displaying the listing of approved teaching methods;

requiring selection from the listing of approved teaching methods of at least one teaching method to be used in the instructional class, permitting selection of additional teaching methods from the listing of approved teaching methods to be used in the instructional class;

comparing a total of the approved teaching methods selected by the instructor user for the instructional class to the total quantity of approved teaching methods required by the core requirements of the group account, informing the instructor user if the total of approved teaching methods selected for the class is less than the quantity required by the core requirements of the group account;

preventing deletions of goals and teaching methods from the class file once the class file has been completed and saved to the database;

providing a listing of activities to select from for starting and ending all lesson plans created for the instructional class, the listing of activities including recording attendance, collecting homework, and recording an assignment;

requesting a name of the school at which the instructional class is to be conducted;

retrieving from the account information of the group account of the instructor user the reporting requirements for class files created by the instructor user;

identifying to the instructor the reporting requirements applicable to class files created by the instructor user;

indicating to the instructor user a time period from the reporting requirements during which elements of an instructional lesson plan must be displayed on a network site;

providing a listing of lesson plan elements available for displaying on the network site, prompting the instructor user to select lesson plan elements for displaying on the network site, prompting the instructor user to select a time relative to a date of the lesson plan for beginning display of the lesson plan on the network site;

showing a standardized format for displaying lesson plan elements;

permitting the instructor user to create a customized format for displaying lesson plan elements;

assembling an instructional lesson plan file for one of the instructional classes having a class file on the database, the step of assembling an instructional lesson plan file including:

displaying names of instructional classes of the instructor user having class files saved on the database;

requiring the instructor user to select a school term for the instructional lesson plan to be created;

requiring the instructor user to select one of the instructional classes of the instructor user having class files saved on the database;

displaying names of any saved units for the instructional class selected by the instructor user;

requiring the instructor user to select one of the saved units for the instructional class or permitting the instructor user to enter a name of a new unit;

displaying a listing of the class goals from the class file for the instructional class and permitting the instructor user to select at least one class goal from the listing of class goals;

requiring identification of at least one unit objective and at least one lesson objective;

displaying the school term, the instructional class, and the unit name for the lesson plan to be created;

permitting the instructor user to enter in the lesson plan any reminders pertaining to the lesson plan;

displaying a listing of procedures for the lesson plan and permitting the instructor user to select at least one of the procedures;

wherein the listing of procedures includes discussions involving a quantity of students selected from the group including an entire class of students, a group of students, a triad of students, and a pair of students;

wherein the listing of procedures includes group work involving a quantity of students selected from the group including a large group of more than six students, an average group of four to six students, and a small group of one to three students;

wherein the listing of procedures includes a presentation by the instructor user or by a student, and wherein the presentation involves use of an activity selected from the group including a demonstration, a lecture, a reading, and a speech;

wherein the listing of procedures includes a quiz that is announced or unannounced and is closed notes or open notes;

wherein the listing of procedures includes a test over material taken from the group including a chapter, a unit, a quarter, a semester, and an entire class;

wherein the listing of procedures includes a writing activity selected from the group including journaling, prewriting, drafting, revising, self-editing, peer-editing, and polishing;

displaying a listing of approved teaching methods and permitting the instructor user to select at least one of the teaching methods from the listing of approved teaching methods;

requesting and recording identification of any desired steps of the instructor user for executing the lesson plan;

requesting and recording identification by the instructor user of any instructor user materials for executing the lesson plan;

requesting and recording identification by the instructor user of any student materials for executing the lesson plan;

requesting and recording identification by the instructor user of any teacher evaluation steps for the lesson plan;

requesting and recording identification by the instructor user of any student evaluation steps for the lesson plan;

requesting and recording identification by the instructor user of any student assignments;

requesting and recording identification by the instructor user of any instructor user notes on success of the lesson plan;

generating a summary report summarizing instructional lesson plans of the instructor user according to criteria based on reporting requirements of the group account covering the instructor user or criteria based on set by the individual instructor user, the step of generating a summary report including:

selecting a basis for summarizing lesson plans, the basis for summarizing lesson plans being selected from the group including all lesson plans for the instructor user during a specified time period, all lesson plans for a selected instructional class, all lesson plans for a selected unit of a selected instructional class, and all lesson plans for the instructor user;

retrieving all lesson plans satisfying the selected basis of the summary report;

determining if a user requesting summary report is the instructor user or an administrator user supervising the instructor user;

accessing the account file for the group account covering the instructor user and determining elements of the retrieved lesson plans for inclusion in the summary report;

counting the elements of the retrieved lesson plans to be included in the summary report;

assembling counts of the elements into a summary report format;

displaying the summary report, wherein the step of displaying the summary report includes printing the summary report.

* * * * *